US011380918B2

(12) United States Patent
Chen et al.

(10) Patent No.: US 11,380,918 B2
(45) Date of Patent: Jul. 5, 2022

(54) SYSTEM AND METHOD FOR MONITORING A REACTOR SYSTEM USING OPTICAL FIBER BASED SENSORS

(71) Applicants: UNIVERSITY OF PITTSBURGH—OF THE COMMONWEALTH SYSTEM OF HIGHER EDUCATION, Pittsburgh, PA (US); UNITED STATES DEPARTMENT OF ENERGY, Washington, DC (US)

(72) Inventors: Peng K. Chen, Washington, PA (US); Jacob Lorenzi Poole, Pittsburgh, PA (US); Paul R. Ohodnicki, Allison Park, PA (US); Thomas D. Brown, Finleyville, PA (US); Kirk R. Gerdes, Morgantown, WV (US); Michael P. Buric, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 270 days.

(21) Appl. No.: 15/501,443

(22) PCT Filed: Aug. 20, 2015

(86) PCT No.: PCT/US2015/046068
§ 371 (c)(1),
(2) Date: Feb. 3, 2017

(87) PCT Pub. No.: WO2016/028990
PCT Pub. Date: Feb. 25, 2016

(65) Prior Publication Data
US 2017/0229724 A1 Aug. 10, 2017

Related U.S. Application Data

(60) Provisional application No. 62/039,658, filed on Aug. 20, 2014.

(51) Int. Cl.
*H01M 8/10* (2016.01)
*H01M 10/48* (2006.01)
(Continued)

(52) U.S. Cl.
CPC ......... *H01M 8/04447* (2013.01); *H01M 8/02* (2013.01); *H01M 8/04328* (2013.01);
(Continued)

(58) Field of Classification Search
None
See application file for complete search history.

(56) References Cited

U.S. PATENT DOCUMENTS 5,498,487 A    3/1996  Ruka et al.
5,658,364 A *  8/1997  DeVore ............... G02B 6/3855
                                                   65/43

(Continued)

OTHER PUBLICATIONS

Ohodnicki, Paul R., Jr. et al., "High temperature optical sensing of gas and temperature using Au-nanoparticle incorporated oxides", Sensors and Actuators B: Chemical, May 21, 2014 (online), vol. 202, pp. 489-499 See abstract: and pp. 489, 490, 493, 496, 498.

*Primary Examiner* — Cynthia H Kelly
*Assistant Examiner* — Julian Anthony
(74) *Attorney, Agent, or Firm* — Philip E. Levy; Eckert Seamans Cherin & Mellott, LLC

(57) ABSTRACT

A method of monitoring operation of a reactor system includes causing a chemical reaction to occur within an assembly of the reactor system, and measuring a chemical composition of one or more reactants of the chemical reaction with spatial resolution at a plurality of points along a path within the assembly using a sensor system structured to implement distributed sensing. The sensor system includes an optical fiber sensing member provided at least partially within the assembly, wherein the optical fiber sensing member comprises a functionalized optical fiber (Continued)

based sensor device structured to exhibit a change in one or more optical properties in response to changes in the chemical composition of the one or more reactants.

18 Claims, 13 Drawing Sheets

(51) Int. Cl.
    *H01M 4/64*     (2006.01)
    *H01M 8/24*     (2016.01)
    *H01M 8/0444*     (2016.01)
    *H01M 8/0432*     (2016.01)
    *H01M 8/12*     (2016.01)
    *H01M 8/02*     (2016.01)
    *H01M 8/2425*     (2016.01)

(52) U.S. Cl.
    CPC ... *H01M 8/04335* (2013.01); *H01M 8/04455* (2013.01); *H01M 8/12* (2013.01); *H01M 8/2425* (2013.01); *H01M 2008/1293* (2013.01)

(56) References Cited

U.S. PATENT DOCUMENTS

| | | | |
|---|---|---|---|
| 5,708,738 A * | 1/1998 | Perez | G02B 6/02133 359/566 |
| 6,519,041 B1 * | 2/2003 | Berthold | G01M 3/226 356/477 |
| 8,411,275 B1 | 4/2013 | Ohodnicki et al. | |
| 2008/0118783 A1 * | 5/2008 | Cetegen | G01K 11/003 429/413 |
| 2010/0284000 A1 * | 11/2010 | Xu | G01F 23/292 356/300 |
| 2014/0203783 A1 * | 7/2014 | Kiesel | H01M 10/4257 320/134 |
| 2015/0133041 A1 * | 5/2015 | Kiya | B60L 50/51 454/69 |

* cited by examiner

SYSTEM AND METHOD FOR MONITORING A REACTOR SYSTEM USING OPTICAL FIBER BASED SENSORS

CROSS-REFERENCE TO RELATED APPLICATIONS

This application claims priority under 35 U.S.C. § 119(e) from U.S. provisional patent application No. 62/039,658, entitled "Optical Fiber-Based SOFC Fuel Utilization Monitoring and Control System" and filed on Aug. 20, 2014, the contents of which are incorporated herein by reference.

GOVERNMENT CONTRACT

This invention was made with government support under grants #DE-FE0004000 and #DE-NE0008303 awarded by the Department of Energy (DOE). The government has certain rights in the invention.

BACKGROUND OF THE INVENTION

1. Field of the Invention

The present invention pertains to optical fiber sensor based monitoring of the chemical composition of reactants and/or temperature in reactor systems, such as, without limitation, power plant systems such as solid oxide fuel cell (SOFC) based systems. In certain particular embodiments, the present invention pertains to fuel-utilization monitoring and control in SOFC applications, and more specifically, to an optical fiber sensor based fuel utilization monitoring and control system for use in, for example and without limitation, SOFC applications.

2. Description of the Related Art

Process control for improved efficiency and lower emissions in current and future generations of fossil fuel based power plants requires novel embedded sensor technology that can operate at high temperatures and in harsh conditions. Relevant applications for such embedded sensors include coal gasification, solid oxide fuel cells, gas turbines, boilers, and oxy-fuel combustion systems. In addition to fossil based power generation, similar needs for sensing in extreme conditions include nuclear power generation, aviation/aerospace, and industrial energy efficiency. Innovations in sensor packaging and design are required to address the embedded sensing needs for these challenging environments but advanced functional sensing materials can potentially enable novel devices with improved stability under extreme conditions.

The ability to perform real-time embedded sensing in a solid oxide fuel cell is important for operational monitoring and control purposes. By monitoring absolute value and spatial gradient of the gas stream composition and temperature, degradation drivers can be identified and potentially mitigated. In addition, real-time operational measurements would enable the use of active controls for optimizing fuel utilization and minimizing long-term degradation.

SUMMARY OF THE INVENTION

In one embodiment, a solid oxide fuel cell system is provided that includes a solid oxide fuel cell stack including a number of solid oxide fuel cells, and a sensor system. The sensor system is structured to measure at least one of (i) a chemical composition of one or more reactants in a gas stream flowing through the solid oxide fuel stack, or (ii) a temperature of the gas stream flowing through the solid oxide fuel stack, the sensor system including an optical fiber sensing member provided at least partially within the solid oxide fuel cell stack. The optical fiber sensing member comprises a functionalized optical fiber based sensor device structured to exhibit a change in one or more optical properties in response to changes in at least one of (a) the chemical composition of the one or more reactants and (b) the temperature of the gas stream.

In another embodiment, a method of monitoring operation of a solid oxide fuel cell system is provided that includes providing a gas stream to a solid oxide fuel cell stack of the solid oxide fuel system, the solid oxide fuel stack having an optical fiber sensing member at least partially provided therein, and measuring at least one of: (i) a chemical composition of one or more reactants in the gas stream, (ii) a temperature of the gas stream or a solid oxide fuel cell of the solid oxide fuel cell system, (iii) a temperature of a solid oxide fuel cell of the solid oxide fuel cell system, or (iv) a strain distribution along a portion of the solid oxide fuel cell system using the optical fiber sensing member, wherein the optical fiber sensing member comprises a functionalized optical fiber based sensor device structured to exhibit a change in one or more optical properties in response to changes in at least one of (a) the chemical composition of the one or more reactants, (b) the temperature of the gas stream, (c) the temperature of the solid oxide fuel cell and (d) strain along the portion of the solid oxide fuel cell system.

In still another embodiment, a method of monitoring operation of a reactor system is provided that includes causing a chemical reaction to occur within an assembly of the reactor system, and measuring a chemical composition of one or more reactants of the chemical reaction with spatial resolution at a plurality of points along a path within the assembly using a sensor system structured to implement distributed sensing. The sensor system includes an optical fiber sensing member provided at least partially within the assembly, wherein the optical fiber sensing member comprises a functionalized optical fiber based sensor device structured to exhibit a change in one or more optical properties in response to changes in the chemical composition of the one or more reactants.

In yet another embodiment, a reactor system is provided that includes an assembly structured to enable a chemical reaction to occur therein, and a sensor system structured to implement distributed sensing and measure a chemical composition of one or more reactants of the chemical reaction with spatial resolution at a plurality of points along a path within the assembly. The sensor system includes an optical fiber sensing member provided at least partially within the assembly, wherein the optical fiber sensing member comprises a functionalized optical fiber based sensor device structured to exhibit a change in one or more optical properties in response to changes in the chemical composition of the one or more reactants.

DETAILED DESCRIPTION OF EXEMPLARY EMBODIMENTS

Figure 1:
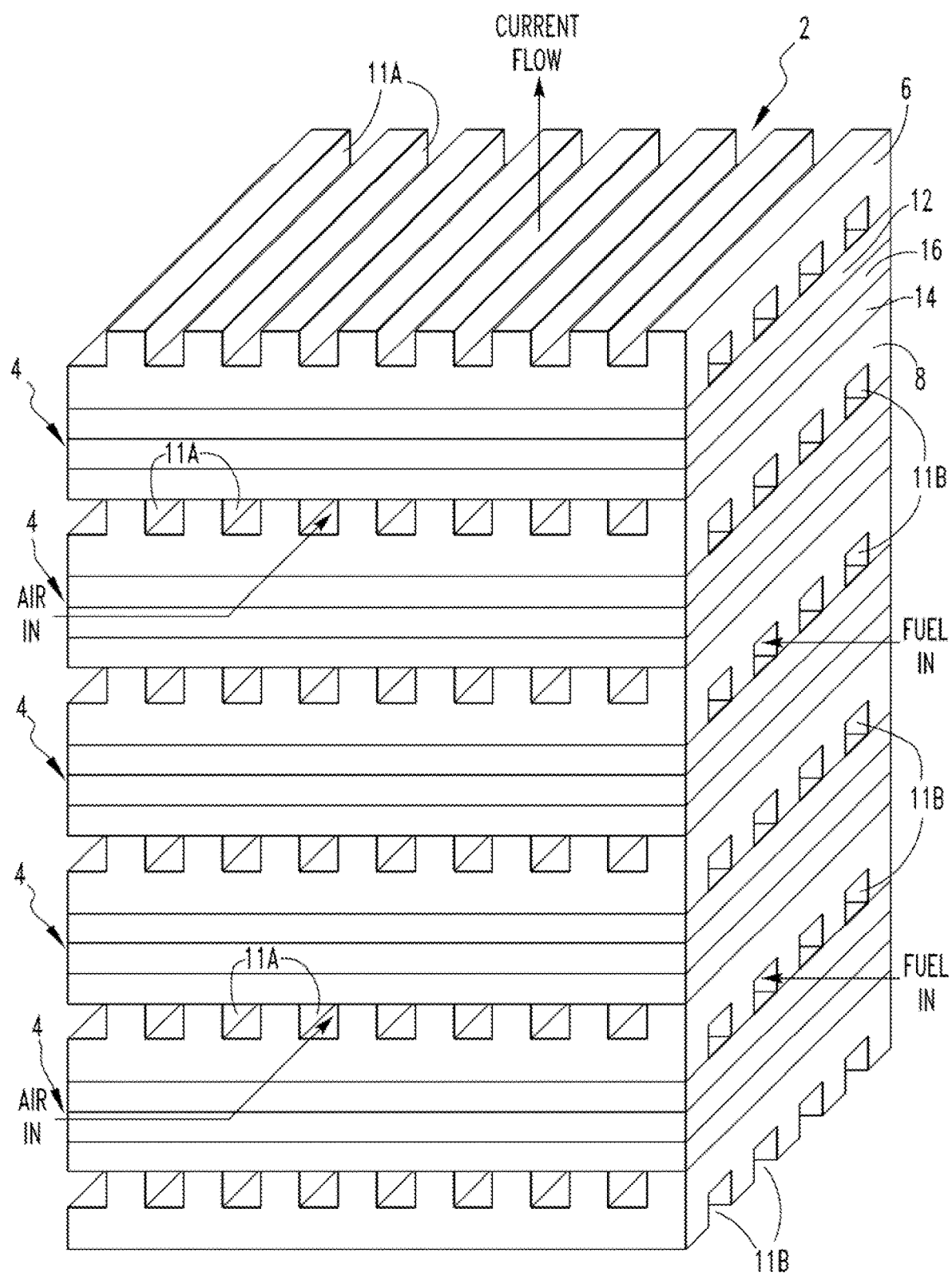
FIG. 1 is a schematic diagram of a prior art SOFC stack including a plurality of prior art solid oxide fuel cells.

As used herein, the singular form of "a", "an", and "the" include plural references unless the context clearly dictates otherwise.

As used herein, the statement that two or more parts or elements are "coupled" shall mean that the parts are joined or operate together either directly or indirectly, i.e., through one or more intermediate parts or elements, so long as a link occurs.

As used herein, "directly coupled" means that two elements are directly in contact with each other.

As used herein, "fixedly coupled" or "fixed" means that two elements are coupled so as to move as one while maintaining a constant orientation relative to each other.

As used herein, the word "unitary" means a part is created as a single piece or unit. That is, a part that includes pieces that are created separately and then coupled together as a unit is not a "unitary" part or body.

As employed herein, the statement that two or more parts or elements "engage" one another shall mean that the parts exert a force against one another either directly or through one or more intermediate parts or elements.

As employed herein, the term "number" shall mean one or an integer greater than one (i.e., a plurality).

As employed herein, the term "reactor system" shall mean a vessel or other enclosure in which chemical components undergo chemical reaction resulting in output byproducts which are chemically different than the inputs.

As employed herein, the term "functionalized optical fiber based sensor device" shall mean a device that includes an optical fiber having one or more sensor elements (including transient sensor elements) such that the functionalized optical fiber based sensor device exhibits a change or changes in optical properties (such as transmitted spectrum, intensity, or polarization, without limitation) in response to changes in environmental parameters in the environment around the in-fiber sensor element(s) (such as chemical composition and/or temperature).

As employed herein, the term "high-temperature" shall mean temperature of approximately 400° C. and higher.

As employed herein, the term "high-temperature stable fiber Bragg grating" shall mean a fiber Bragg grating capable of maintaining its reflective properties at high-temperatures for long periods of time (e.g., weeks, months or years of continuous operation) without significant degradation of those properties.

As employed herein, the terms "scattering based system" and "scattering based interrogation approach" shall mean a system or interrogation method in which the basis of measurement is the collection of light scattered by materials present in the fiber sensor or the environment, respectively.

As employed herein, the term "back scattering based interrogation" shall mean sensor interrogation utilizing scattering emerging from the same end of the sensing fiber as the interrogation source.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As described in greater detail herein, the disclosed concept relates to the application of embedded optical fiber based sensors to a reactor system in conjunction with high temperature stable distributed interrogation approaches to allow for local monitoring of the absolute value of and/or spatial gradient of the chemical composition and/or temperature within the reactor system. In various exemplary embodiment described herein, the disclosed concept is applied in connection with an operational SOFC to allow for local monitoring of the absolute value and/or spatial gradient of the chemical composition and/or temperature within an anode and/or cathode stream of the SOFC. Successful monitoring of the absolute value and gradient in both temperature and composition of the gas stream at various points within a cell would enable a number of new real-time active control options to optimize the overall performance and lifetime of the cell that include (1) cathode air flow rate, (2) current density change, (3) fuel dilution with species such as inerts, CO, or steam, and (4) natural gas flow rate into a reformer at the inlet side. The ability to perform real-time embedded sensing in a solid oxide fuel cell is important for operational monitoring and control purposes. By monitoring absolute value and spatial gradient of the gas stream composition and temperature, degradation drivers can be identified and potentially mitigated. In addition, real-time operational measurements would enable the use of active controls for optimizing fuel utilization and minimizing long-term degradation.

It will be understood, however, that the application within an operational SOFC is meant to be exemplary only, and that the disclosed concept may be applied to allow for local monitoring of the absolute value and/or spatial gradient of the chemical composition and/or temperature within other reactors systems that present extreme conditions. For example, other relevant applications include coal gasification, gas turbines, boilers, oxy-fuel combustion systems, petrochemical processing, refineries, glass making, steel making and chemical production reactors such as a cement kiln or fertilizer production facility. In addition to fossil based power generation, similar needs for sensing in extreme conditions include nuclear power generation, aviation/aerospace, and industrial energy efficiency.

Figure 2:
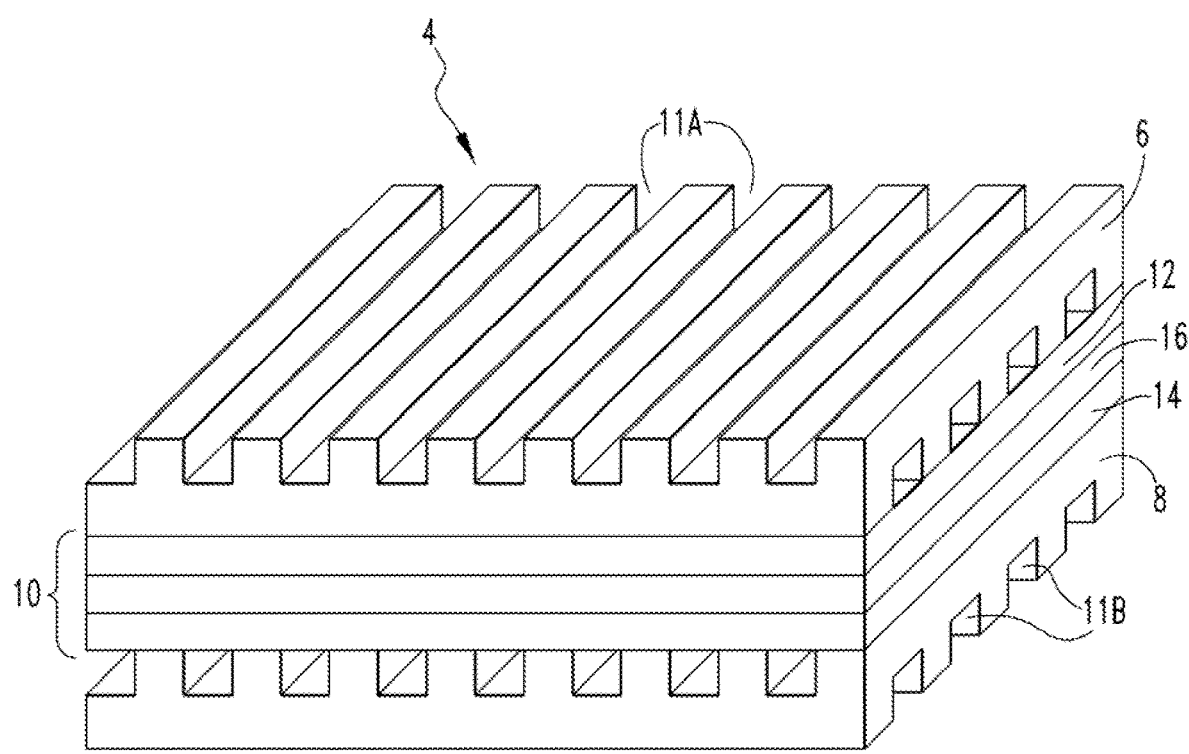
FIG. 2 is a schematic diagram showing an exemplary solid oxide fuel cell of the SOFC stack of FIG. 1.

As is known in the art, an SOFC is an electrochemical conversion device that produces electricity by oxidizing a fuel. FIG. 1 is a schematic diagram of a prior art SOFC stack 2 including a plurality of prior art solid oxide fuel cells 4, and FIG. 2 is a schematic diagram showing an exemplary solid oxide fuel cell 4 of SOFC stack 2. As seen in FIGS. 1 and 2, each solid oxide fuel cell 4 includes several components arranged in a layered fashion. Those components include a first conductive interconnect 6, a second conductive interconnect 8, and a ceramic component 10 provided in between first conductive interconnect 6 and second conductive interconnect 8. Ceramic component 10 includes an anode layer 12, a cathode layer 14, and an electrolyte layer 16 provided in between the anode layer 12 and the cathode layer 14. As seen in FIG. 1, the plurality of solid oxide fuel cells 4 are connected in series to form the SOFC stack 2.

In operation, a fuel stream (typically $H_2$ gas) is provided through SOFC stack 2 over anode layers 12 in a first direction via passageways 11A provided in first conductive interconnect 6, and an air stream is provided through SOFC stack 2 over cathode layers 14 in a second direction via passageways 11B provided in second conductive interconnect 8 as shown in FIG. 1. The exemplary SOFC stack 2 shown in FIG. 1 is a "non-co-flow stack", meaning the paths of the fuel stream and the air stream are orthogonal to one another. As described below, other types of stacks are also known and are contemplated within the scope of the disclosed concept. In the cathode layers 14, oxygen in the air stream is reduced into oxygen ions. Those ions then diffuse through electrolyte layers 16 to anode layers 12, where they electrochemically oxidize the fuel in the fuel stream. In this reaction, a water byproduct is given off as well as electrons. Those electrons then flow through an external circuit as shown in FIG. 1 to produce electrical current.

The ceramic materials used in ceramic components 10 of solid oxide fuel cells 4 do not become electrically and ionically active until they reach very high temperatures, and as a result, SOFC 4 must typically be operated at temperatures ranging from 500° C. to 1000° C. These high temperatures present challenges for implementing an embedded sensor solution.

Figure 3:
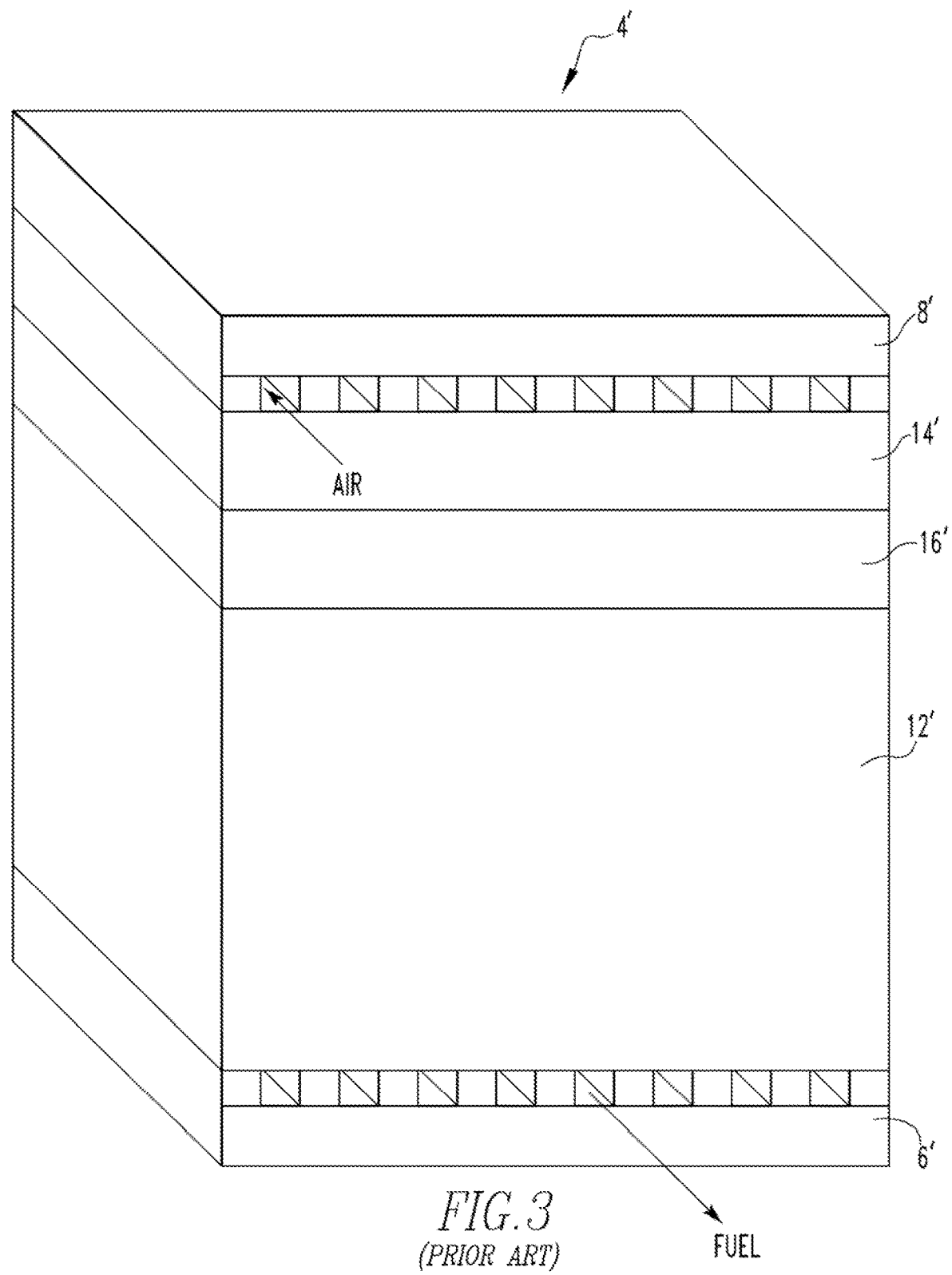
FIG. 3 is a schematic diagram showing an alternative prior solid oxide fuel cell.

FIG. 3 is a schematic diagram showing an alternative prior solid oxide fuel cell 4'. Solid oxide fuel cell 4' is similar to solid oxide fuel cell 4, and includes first conductive interconnect 6', second conductive interconnect 8', anode layer 12', cathode layer 14', and electrolyte layer 16'. In solid oxide fuel cell 4', however, the paths of the fuel and air streams are parallel to one another, and thus solid oxide fuel cell 4' may be used to make what is known as a "co-flow stack". In addition, the solid oxide fuel cell 4' is comprised of a relatively thick anode layer to form a so-called anode supported cell The operation of such a "co-flow stack" is essentially the same as the operation of the exemplary "non-co-flow stack" described above.

Several unique aspects of high-temperature solid-oxide fuel cell systems and other similar harsh-environment chemical production reactors have traditionally precluded the use of common sensor systems for process control. Firstly, the physical nature of these systems has traditionally made sensor integration difficult to implement for one of ordinary skill in the art of sensor implementation. Inside an SOFC, electrical sensors are problematic due to the high current densities and cell voltages present. Furthermore, the small dimensions available in fuel-cell interconnects prevent the use of any type of sensor with significantly large cross sectional area. This same set of problems often occurs in chemical reactors with micro-channels or restricted internal dimensions. The presence of harsh chemical environments also often precludes the use of electrochemical sensors or other conventional types of devices.

The disclosed concept provides fiber-based designs that have been specifically formulated by the inventors to be compatible with these types of harsh environments via a number of relevant techniques, described in detail herein. Firstly, the use of materials such as high-temperature metal-oxide coatings, high-temperature stable fiber Bragg gratings, and high-temperature-compatible transduction techniques (such as scattering-based systems) for transducing environmental parameters into optical responses permits application to these systems. The use of high-temperature and chemical resistant fiber substrates known to the inventors (including high-temperature silica, sapphire, or other suitably designed materials) also permits application in such systems. Finally, the unique packaging solutions described herein permits integration of the sensor and fiber materials using materials designed to be compatible with the SOFC components or with a similar chemical reactor system exhibiting the same sort of harsh environment. The disclosed concept also allows for the elimination of electrical wires and contacts in the harsh environment. This is important because wires or electrical contacts are often the failure point for sensors in harsh environments. In addition to the benefits of the physical nature of the disclosed concept, the idea of performing distributed sensing in such environments has not been previously detailed by others due to the same technical difficulties precluding the realization of single-point chemical sensing therein.

Figure 4:
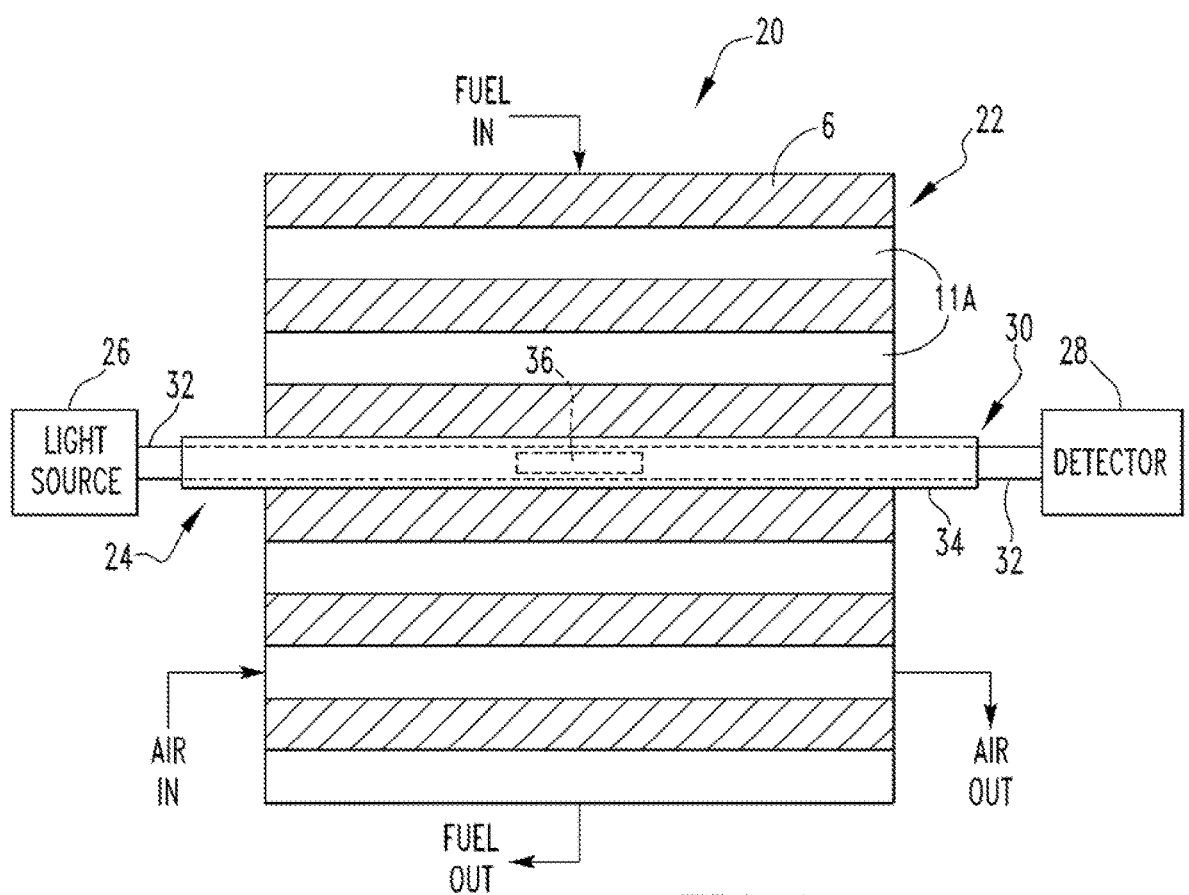
FIG. 4 is a schematic diagram of an SOFC system (showing a top plan view) according to an exemplary embodiment of the disclosed concept.
Figure 5:
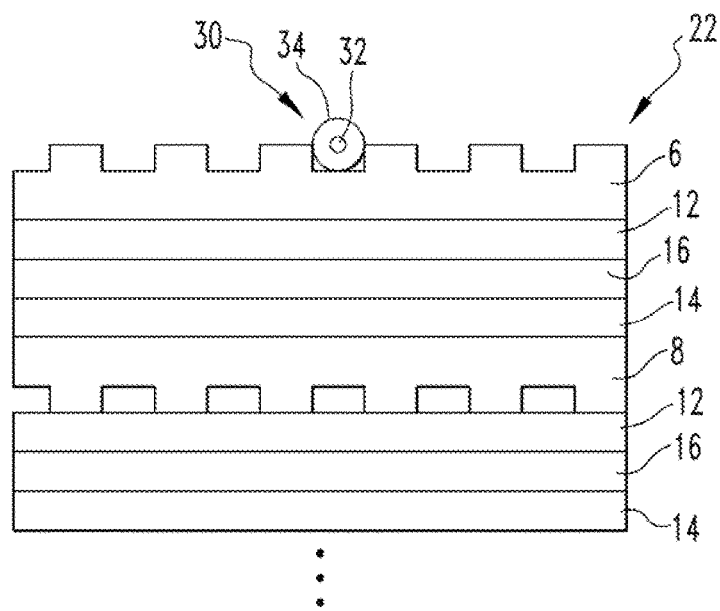
FIG. 5 is a schematic diagram showing a side view of a portion of the SOFC system of FIG. 4.

FIG. 4 is a schematic diagram of an SOFC system 20 (showing a top plan view) according to an exemplary embodiment of the disclosed concept that, as described in detail herein, includes embedded optical fiber based sensor technology to allow for the monitoring of the absolute value of the chemical composition and/or temperature of the fuel (anode) and/or air (cathode) streams within SOFC system 20 or the temperature of a portion of the SOFC system 20 itself (such as solid oxide fuel cells 4). FIG. 5 is a schematic diagram showing a side view of a portion of SOFC system 20.

Referring to FIGS. 4 and 5, SOFC system 20 includes an SOFC stack 22. SOFC stack 22 is similar to SOFC stack 2 described elsewhere herein, and includes many of the same components thereof that are described herein, including a plurality solid oxide fuel cells 4, each including a first conductive interconnect 6, a second conductive interconnect 8, an anode layer 12, a cathode layer 14, and an electrolyte layer 16. SOFC system 20 further includes a sensing system 24 that is structured to monitor gas stream composition and/or temperature within one or more portions of SOFC stack 22. Sensor system 24 includes a light source 26, a detector 28, and an optical fiber sensing member 30. Optical fiber sensing member 30 includes an optical fiber member 32, and a packaging assembly 34 that receives a portion of optical fiber member 32 therethrough. As seen in FIGS. 4 and 5, in the non-limiting, illustrative embodiment, the portion of optical fiber sensing member 30 that includes packaging assembly 34 is received within one of the passageways 11A of first conductive interconnect 6. The first end of optical fiber member 32 is coupled to light source 26 and the second end of optical fiber member 32 is coupled to detector 28. As shown schematically in FIG. 4, optical fiber sensing member 30 is an optical fiber based sensor device that includes, in the exemplary embodiment, a single point in-fiber sensing element 36 (alternatively, the sensing element can be extended in space rather than being a "single point" element). Furthermore, packaging assembly 34 is not necessarily required, and in some cases and exposed optical fiber sensing element within the SOFC anode or cathode stream might be sufficient.

Single point in-fiber sensing element 36 may be any of a number of known or hereafter developed in-fiber sensing elements. For example, a suitable in-fiber sensing element 36 may be a silica-based optical fiber with the cladding removed and a $SrTiO_3$ or La-doped $SrTiO_3$ thin film coated on the exposed core as described in U.S. patent application Ser. No. 14/335,149, entitled "Electronically Conductive Perovskite-Based Oxide Nanoparticles and Films for Optical Sensing Applications" and filed Jul. 18, 2014, the disclosure of which is Incorporated herein by reference. As another example, a suitable in-fiber sensing element 36 may be a $TiO_2$, Nb-doped $TiO_2$, or Pd-doped $TiO_2$ thin film coated optical fiber as described in U.S. Pat. No. 8,638,440, entitled "Plasmonic Transparent Conducting Metal Oxide Nanoparticles and Films for Optical Sensing Applications". Another suitable in-fiber sensing element 36 may be achieved through the incorporation of gold nanoparticles within inert matrix materials of SiO2, Al2O3, and Si3N4 as a thin film coated on an optical fiber as described in U.S. Pat. No. 8,411,275, entitled "Nanocomposite Thin Films for High Temperature Optical Gas Sensing of Hydrogen". The disclosures of these documents are incorporated herein by reference in all cases.

In operation, source light is introduced into optical fiber sensing member 30 from light source 26, and, in response thereto, light is transmitted through optical fiber sensing member 30 and received at detector 28. Optical fiber sensing member 30 and in-fiber sensing element 36 are structured such that one or more optical properties thereof will change depending upon the chemical composition of the gas surrounding in-fiber sensing element 36 and/or the temperature around in-fiber sensing element 36 at any particular time. As a result, one or more properties of the light transmitted through optical fiber sensing member 30 and detected by detector 28 will, as is known in the art, be indicative of the chemical composition and/or temperature around in-fiber sensing element 36 at any particular time. Thus, in the configuration shown in FIG. 4, sensing system 24 may be used to measure the chemical composition of and/or the temperature of the gas stream flowing through the interconnect 6 shown in FIG. 4, which is the cathode stream.

In one particular embodiment, the optical sensing element 36 exhibits modifications to the optical absorption in the presence of hydrogen gas. For example, in the case of Au-nanoparticle incorporated oxides such as Au/SiO2 a characteristic localized surface plasmon resonance absorption peak has been demonstrated to shift to shorter wavelengths in reducing gas atmospheres such as $H_2$-containing gas streams. Such effects have been discussed in detail previously in connection with U.S. Pat. No. 8,411,275. The change in optical absorption is then related to the hydrogen composition over a one or a range of wavelengths. Transmitted intensity over this same wavelength or range then correlates to hydrogen gas composition and can be quantified through appropriate calibration techniques.

Figure 6:
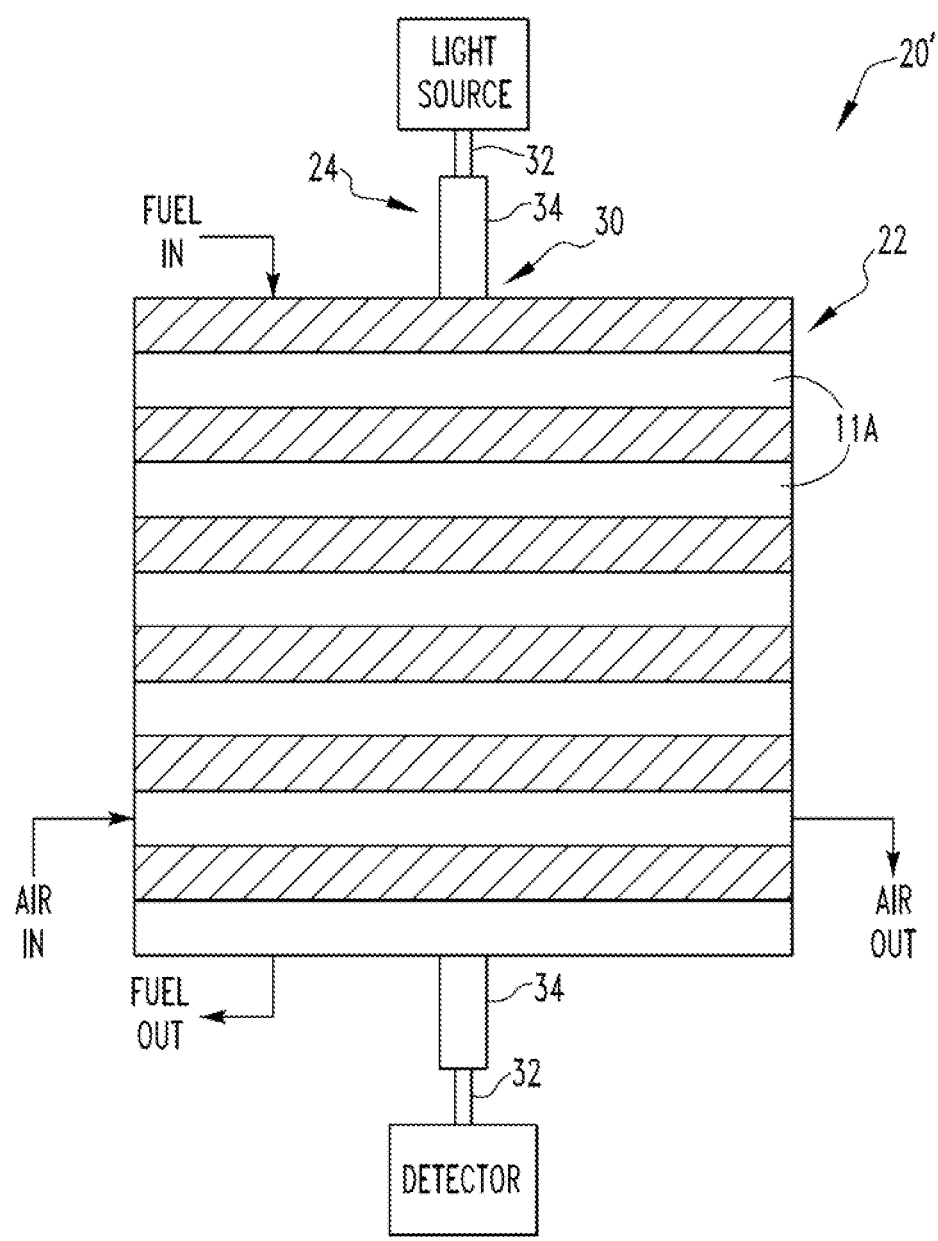
FIGS. 6-12 are schematic diagrams of SOFC systems (showing top plan views) according to a number of alternative exemplary embodiments of the disclosed concept.

It will be understood, however, that the particular configuration shown in FIGS. 4 and 5 and described above (which is positioned in the cathode stream) is exemplary only, and that a similar configuration may be used to measure the chemical composition and/or temperature of the anode stream, either alone (see, for example, FIG. 6 which shows alternative SOFC system 20' in which optical fiber sensing member 30 is positioned in a passageway 11B in the anode stream) or in conjunction with the measurement of the cathode stream as just described, or the anode and/or cathode stream at different locations within SOFC stack 22.

In addition, packaging assembly 34 comprising an outer tube illustrated in FIGS. 4 and 5 is optional, but does provide enhanced mechanical robustness. Also, in some cases, it may be desirable to use something like an alumina tube to block the gas stream from contacting the fiber directly so that it is preferentially sensitive to temperature rather than gas stream composition as well. For example, the absorption peak of Au particles in silica depends on both gas composition and temperature. It may thus be possible to simultaneously measure temperature and gas composition through multi-wavelength monitoring. However, it could also be possible to isolate the sensing layer from the gas phase to only make it sensitive to temperature.

While effective, the configuration shown in FIGS. 4 and 5 is only capable of providing information about the average value of the sensed parameter at the location of in-fiber sensing element 36. Thus, according to a further aspect of the disclosed concept, optical fiber sensor technology is integrated with more complex interrogation approaches (as described below) in connection with a number of alternative embodiments to enable distributed sensing of parameters of interest (such as chemical composition, temperature or strain distribution) across a device such as an SOFC stack. Such multi-point sensing capability will provide a wealth of new information that will be useful from the stand-point of process control, including gradients in fuel gas stream composition and temperature. Multi-point sensing can be done in a variety of ways which may resolve a continuous distribution of the sensed parameter as a function of position through: (i) scattering (e.g., back-scattering) based approaches (for example, known Rayleigh scattering, Brillouin scattering, or Raman scattering approaches), or (ii) a discrete set of sampling points through the use of multiple sensor elements provided in an array, such as fiber Bragg gratings inscribed in the sensor core along with a functionalized overcoating. An example of such a back-scattering approach is described in R. G. Duncan, B. J. Soller, D. K. Gifford, S. T. Kreger, R. J. Seeley, A. K. Sang, M. S. Wolfe, and M. E. Froggatt, "OFDR-Based Distributed Sensing and Fault Detection for Single- and Multi-Mode Avionics Fiber-Optics", available at http://lunainc.com/wp-content/uploads/2012/08/OFDR-Based-Distributed-Sensing.pdf. Examples of the use of multiple sensor elements are described in L. C. G. Valente et al., "Time and Wavelength Multiplexing of Fiber Bragg Grating Sensors Using a Commercial OTDR", Optical Fiber Sensors Conference Technical Digest, May 10, 2002, Portland, Oreg.

Unlike localized fiber optic sensors such as fiber Bragg gratings, non-localized distributed sensors offer the unique characteristic of being able to use the entire length of an un-modified optical fiber as a sensor, allowing the measurements of thousands of points along the fiber. The most developed technologies of distributed fiber optic sensors, which have sufficient spatial resolutions and can perform both strain and temperature measurements, are based on Brillouin scattering and Rayleigh scattering.

In Brillouin scattering, as a nonlinear interaction between the light and the silica material, if an intense optical pulse is launched into a fiber, it will generate lattice vibration with characteristic frequency $\Omega_B$ in a form of pressure wave (i.e. phonon), which periodically modulates density of the fiber. This wave can be treated as transient gratings in the fiber traveling at speed of the sounds Va associated with the acoustic wave frequency $\Omega_B$. When these moving transient gratings diffract the probing light, the frequency of the probing light will experience a Doppler frequency shift of $\pm\Omega_B$, depending on relative directions between the sound wave and probing light. Since the acoustic frequency $\Omega_B$ depends on the temperature or strain in optical fibers, the measurement of $\Omega_B$ as the function of travel time t of optical pulse provides spatially resolved strain or temperature measurement. From this basic principle, the spatial resolution of the Brillouin scattering depends on the pump pulse width. An optical time domain reflectrometry technique (OTDR) is usually employed, in which the system is probed by fast laser pulses and the spatial resolution is limited by the pulse duration. Typically, optical pulses at 1 GHz are used, which lead to typical spatial resolution of OTDR around ~30 cm to 1 meter. The Brillouin technique can achieve >50 km level distributed measurement with 1-m level spatial resolution.

Rayleigh scattering is an elastic scattering of light by subwavelength-size particles during light propagation. In optical fibers, the density fluctuations of silica material give rise to the Rayleigh scattering loss. The scattering coefficient in optical fiber can be estimated as:

$$\alpha(z)_{Rayleigh} = \frac{8\pi}{3\lambda^4}[n(z)^8 p^2](kT_f)\beta$$

Where n(z) is the refractive index profile, p is the photo-elastic coefficient, k is the Boltzmann constant, $\beta$ is the isothermal compressibility, and $T_f$ is the fictive temperature at which the density fluctuations are frozen. Rayleigh backscatter in an optical fiber is caused by random fluctuations in the index profile n(z) along the fiber length, which can be modeled as a very weak and long FBG with random period. When external stimulus (T strain) changes the local index, it changes the local reflection spectrum, which can be used as a sensing signal measured by an Optical Frequency Domain Reflectometry (OFDR) technique.

A primary challenge of distributed sensing approaches employing multiple sensor elements, such as fiber Bragg gratings, provided in an array in high temperature environments, such as an SOFC system, is the stability of fiber Bragg gratings in fabricated devices. Recent developments in generating high temperature stable fiber gratings can potentially help to overcome this latter technological challenge, and, according to an aspect of the disclosed concept, may be used in connection with the various embodiments described herein. Example of such a high temperature stable fiber gratings are described in United States Patent Application Publication Number 2014/0321798, entitled "Optical Sensor Employing a Refractive Index Engineered Metal Oxide Material", the disclosure of which is incorporated herein by reference, and in Zsolt L. Poole, Paul Ohodnicki, Michael Buric, Aidong Yan, Shaymaa Riyadh, Yuankun Lin, and Kevin P. Chen, "Block Copolymer Assisted Refractive Index Engineering Of Metal Oxides For Applications In Optical Sensing," Proc. SPIE 9161, Nanophotonic Materials XI, 91610P (Sep. 10, 2014), and T. Chen, R. Chen, C. Jewart, B. Zhang, K. Cook, J. Canning, and K. P. Chen, "Regenerated Gratings in Air-Hole Microstructured Fibers for High-Temperature Pressure Sensing", Optics Letters 36 (18), 3542-4 (2011), and Y. K. Cheong, W. Y. Chong, S. S. Chong. K. S. Lim, and H. Ahmad, "Regenerated Type-IIa Fibre Bragg Grating from a Ge—B Codoped Fiber via Thermal Activation", Optics & Laser Technology 62, 69-72 (2014).

Figure 7:
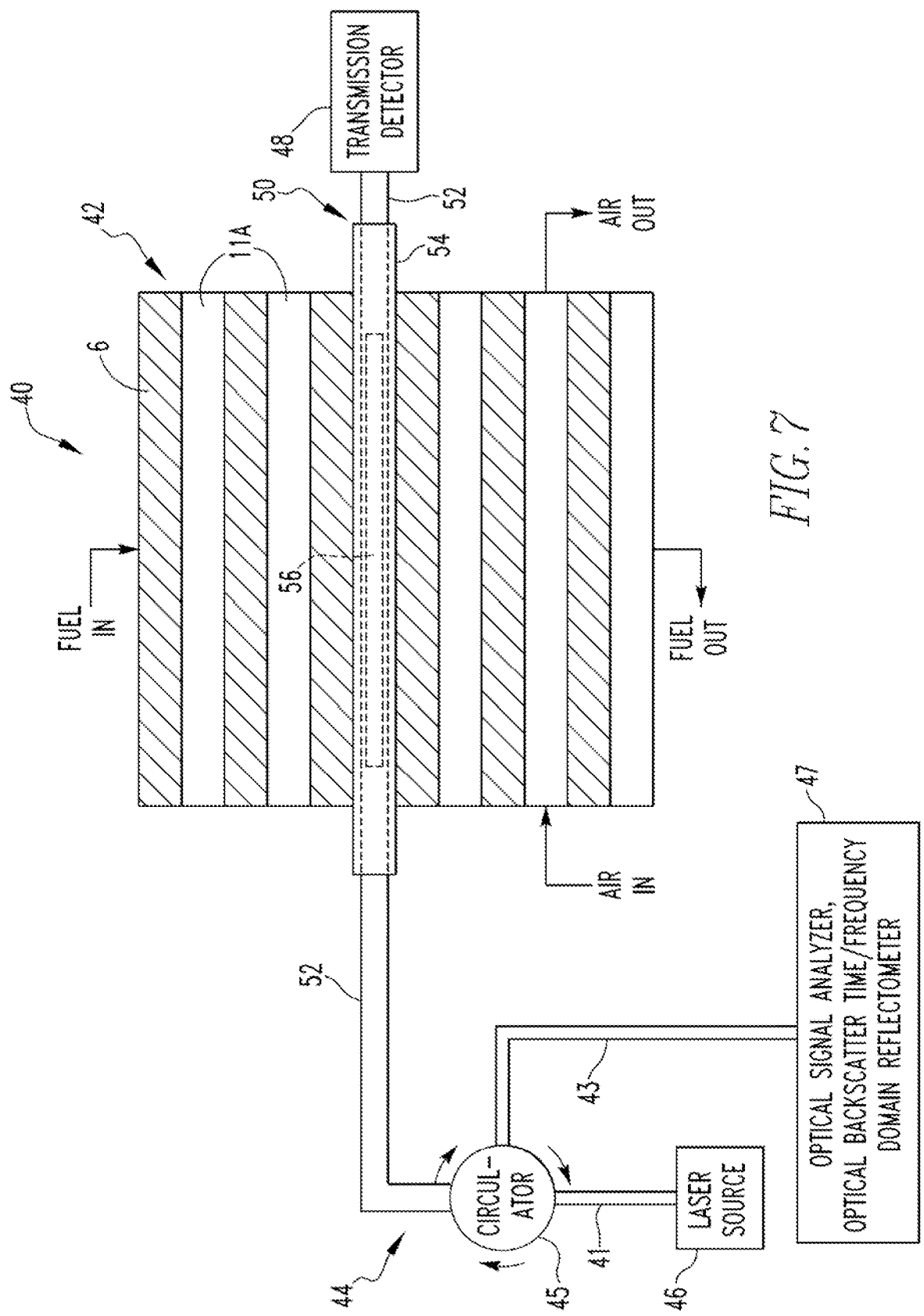

FIG. 7 is a schematic diagram of an SOFC system 40 (showing a top plan view) according to another exemplary embodiment of the disclosed concept that, as described in detail herein, includes embedded optical fiber based sensor technology to allow for the distributed sensing of the chemical composition and/or temperature of the fuel (anode) and/or air (cathode) streams within SOFC system 40 with spatial resolution. Referring to FIG. 7, SOFC system 40 includes an SOFC stack 42. SOFC stack 42 is similar to SOFC stack 22 described elsewhere herein, and includes many of the same components thereof that are described herein, including a plurality solid oxide fuel cells 4, each including a first conductive interconnect 6, a second conductive interconnect 8, an anode layer 12, a cathode layer 14, and an electrolyte layer 16. SOFC system 40 further includes a sensing system 44 that is structured to utilize distributed sensing as described herein to monitor gas stream composition and/or temperature within one or more portions of SOFC stack 42 with spatial resolution. In the illustrated embodiment, sensing system 44 includes a laser source 46, a transmission detector 48, a circulator 45, an optical signal analyzer, optical backscatter time/frequency domain reflectometer 47, transmission fibers 41 and 43, and an optical fiber sensing member 50. It will be appreciated that transmission detector 48 may not be necessary in cases where only backscattering is being measured. Transmission detector 48 is thus optional. Optical fiber sensing member 50 includes an optical fiber member 52, and a packaging assembly 54 that receives a portion of optical fiber member 52 therethrough (as noted elsewhere herein, packaging assembly 54 may not always be required). As seen in FIG. 7, in the non-limiting, illustrative embodiment, the portion of optical fiber sensing member 50 that includes packaging assembly 54 is received within one of the passageways 1 IA of first conductive interconnect 6. The first end of optical fiber member 52 is coupled to circulator 45 and the second end of optical fiber 52 is coupled to transmission detector 48. As shown schematically in FIG. 7, optical fiber sensing member 50 is a functionalized optical fiber based sensor device that includes a monolithic in-fiber sensing element 56 that is structured to enable continuous distributed sensing of chemical composition and/or temperature using a backscattering based interrogation approach, for example as described herein.

In operation, fiber sensing element 56 exhibits a change in optical absorption in the presence of a particular parameter of interest, for example a change in concentration of hydrogen in the gas stream. The change in absorption is correlated with the hydrogen concentration in well designed sensor elements, which results in optical transmission over a range of wavelengths which is correlated to hydrogen composition. Consequently, the backscattering which is intrinsic to all optical materials (including the fiber sensor element) is also correlated in intensity to the concentration of hydrogen gas. When interrogated with an optical backscattering based distributed interrogator, the hydrogen gas composition may further be correlated with physical distance or position along the fiber sensor element. In combination with appropriate calibration techniques, the approach described can allow for quantification of the absolute magnitude and/or gradient in hydrogen gas stream concentration.

Thus, in the configuration shown in FIG. 7, sensing system 44 may be used to measure the chemical composition and/or the temperature of the gas stream flowing through the first conductive interconnect 6 shown in FIG. 7, which is the cathode stream, with spatial resolution along that path. It will be understood, however, that this is exemplary only, and that a similar configuration may be used to measure the chemical composition and/or temperature of the anode stream, either alone (see, for example, FIG. 8, which shows alternative SOFC system 40' in which optical fiber sensing member 50 is positioned in a passageway 11B in the anode stream) or in conjunction with the measurement of the cathode stream as just described, or the anode and/or cathode stream at different locations within SOFC stack 42.

Figure 8:
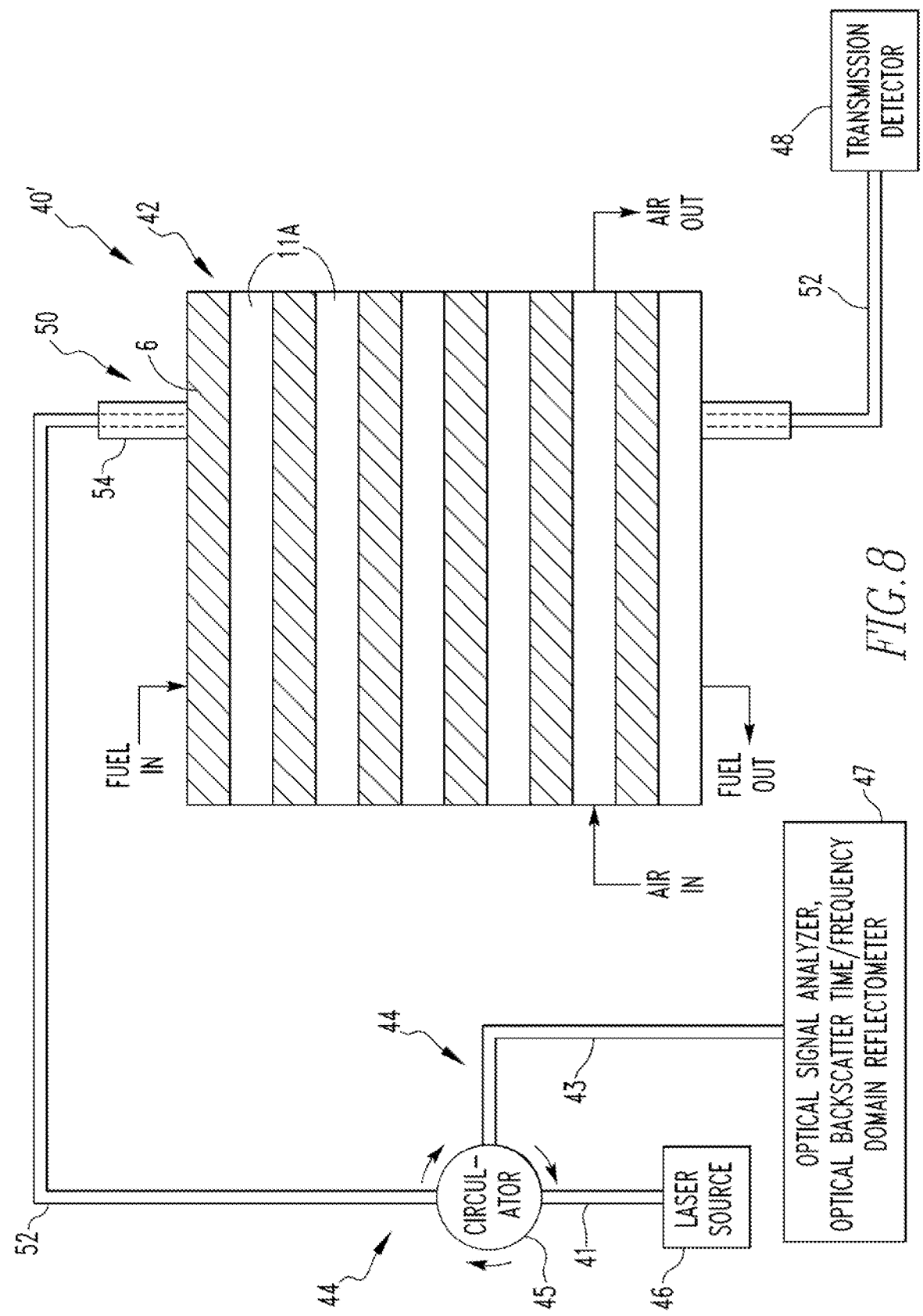
Figure 9:
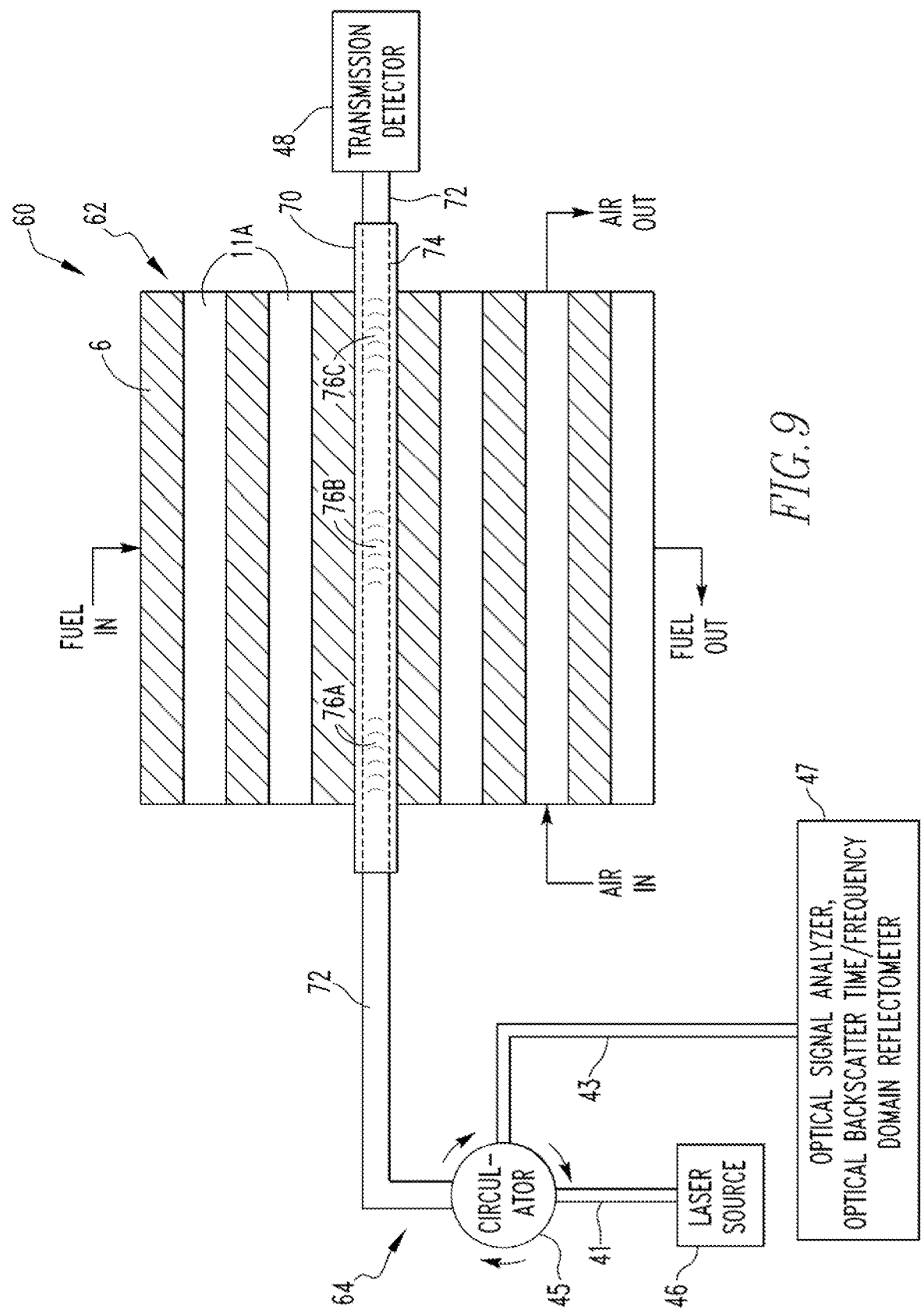

FIG. 9 is a schematic diagram of an SOFC system 60 (showing a top plan view) according to yet another exemplary embodiment of the disclosed concept that, as described in detail herein, includes embedded optical fiber based sensor technology to allow for the distributed sensing of the chemical composition and/or temperature of the fuel (anode) and/or air (cathode) streams within SOFC system 60 with spatial resolution. Referring to FIG. 8, SOFC system 60 includes an SOFC stack 62. SOFC stack 62 is similar to SOFC stack 42 described elsewhere herein, and includes many of the same components thereof that are described herein, including a plurality solid oxide fuel cells 4, each including a first conductive interconnect 6, a second conductive interconnect 8, an anode layer 12, a cathode layer 14, and an electrolyte layer 16. SOFC system 60 further includes a sensing system 64 that is similar to sensing system 44 and that is structured to utilize distributed sensing as described herein to monitor gas stream composition and/or temperature within one or more portions of SOFC stack 62 with spatial resolution. Sensing system 64 is similar to sensing system 44, and like components are labeled with like reference numerals. However, sensing system 64 includes an alternative optical fiber sensing member 70. As shown schematically in FIG. 9, optical fiber sensing member 70 is a functionalized optical fiber based sensor device that includes a series/array of high temperature stable fiber Bragg grating sensor elements 76A, 76B, 76C (as described elsewhere herein) that are structured to enable continuous distributed sensing of chemical composition and/or temperature.

In operation, light is produced by the laser source 46 and is launched through the circulator 45 into optical fiber sensing member 70. The source laser wavelength is swept over a range corresponding to the reflection peaks produced by the fiber Bragg grating sensor elements 76A, 76B, 76C. Those reflection peaks undergo a wavelength shift and/or intensity modulation which can be correlated to the sensed parameter. Reflections produced by fiber Bragg grating sensor elements 76A, 76B, 76C are in turn directed by the circulator 45 to optical signal analyzer, optical backscatter time/frequency domain reflectometer 47. Each fiber Bragg grating sensor elements 76A, 76B, 76C is identified by the interrogation system via either the time of flight of optical pulses produced by the laser or the center wavelength of the grating. In an alternative embodiment, transmitting fiber Bragg grating sensor elements, which are known, may be used in place of fiber Bragg grating sensor elements 76A, 76B, 76C.

Thus, in the configuration shown in FIG. 9, sensing system 64 may be used to measure the chemical composition of and/or the temperature of the gas stream flowing through the interconnect 6 shown in FIG. 9, which is the cathode stream, with spatial resolution along that path. It will be understood, however, that this is exemplary only, and that a similar configuration may be used to measure the chemical composition and/or temperature of the anode stream, either alone (for example employing optical fiber sensing member 70 in place of optical fiber sensing member 50 in FIG. 8) or in conjunction with the measurement of the cathode stream as just described, or the anode and/or cathode stream at different locations within SOFC stack 62.

As noted elsewhere herein, it may be advantageous to place a number of optical fiber sensing members (e.g., optical fiber sensing member 30, 50, or 70) throughout an SOFC stack at different locations in order to provide additional information into the operational condition of the SOFC stack. However, because the overall cost of a sensing device is largely dictated by the light source and the interrogation instrumentation, it may, according to an aspect of the disclosed concept, be advantageous for a single interrogation system to be used in conjunction with multiple optical fiber sensing members through the use of optical switches and optical couplers as described below. In this way, operational conditions may be monitored with multiple sensors in a cost-effective manner.

Figure 10:
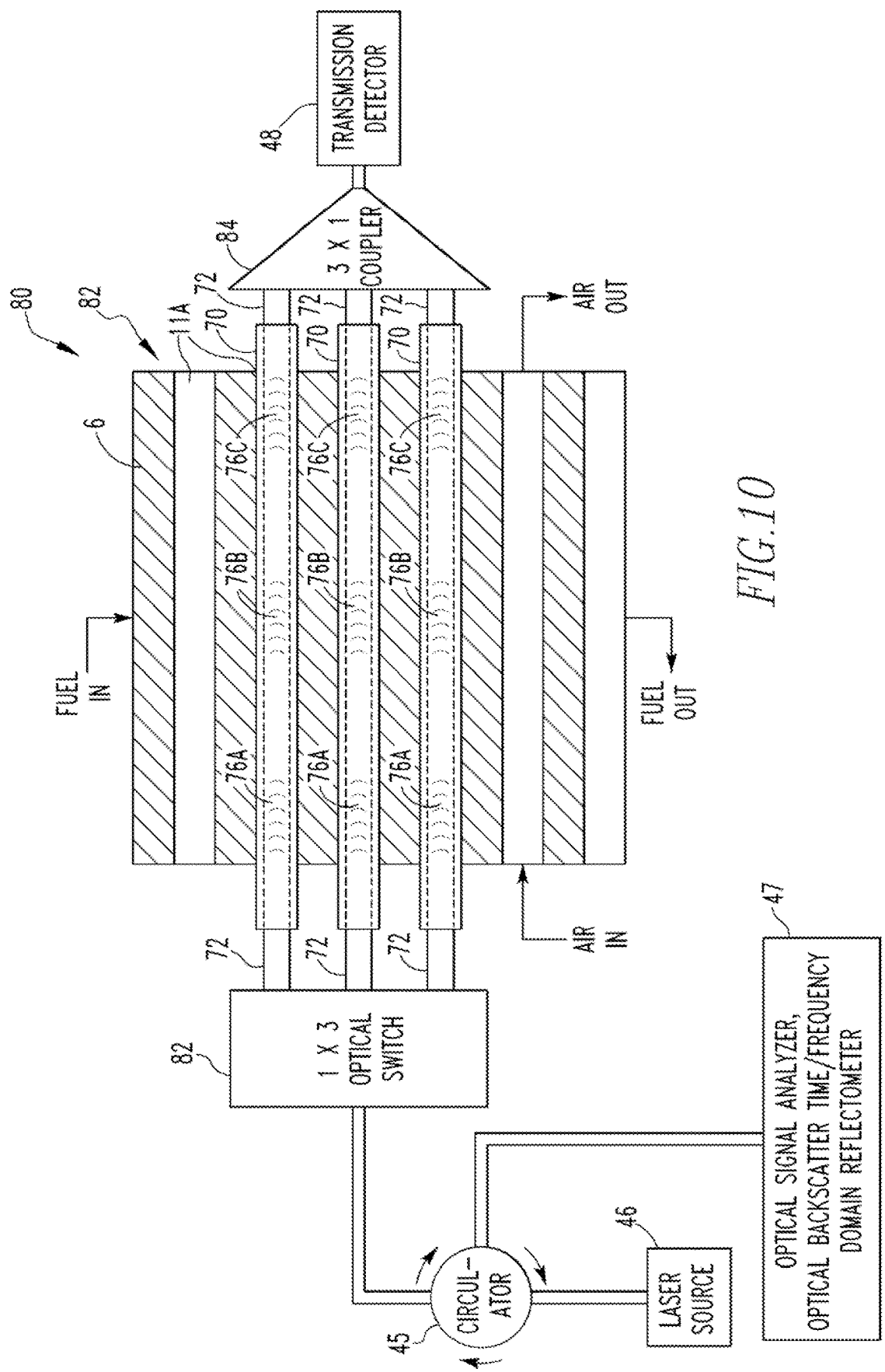
Figure 11:
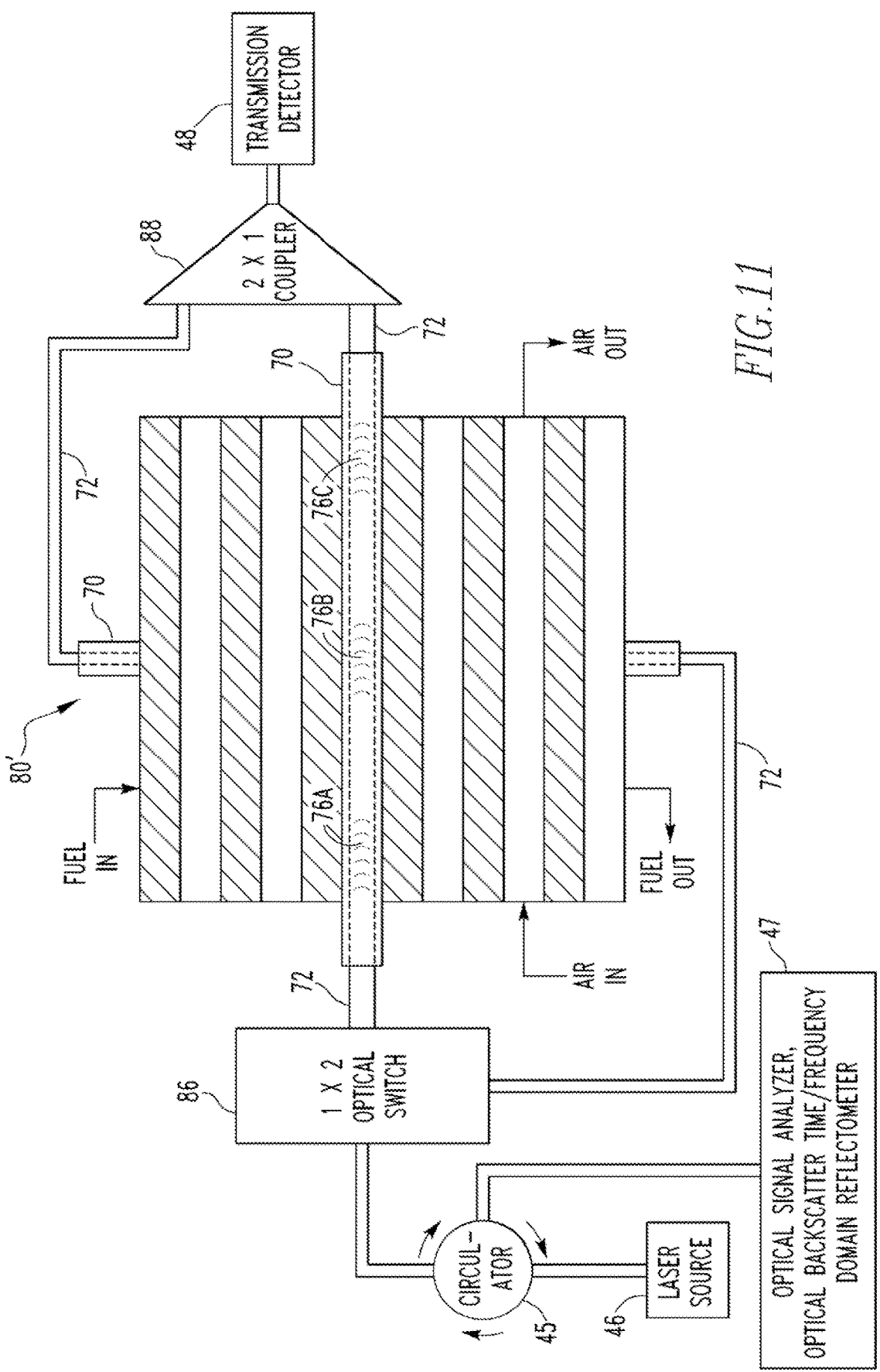
Figure 12:
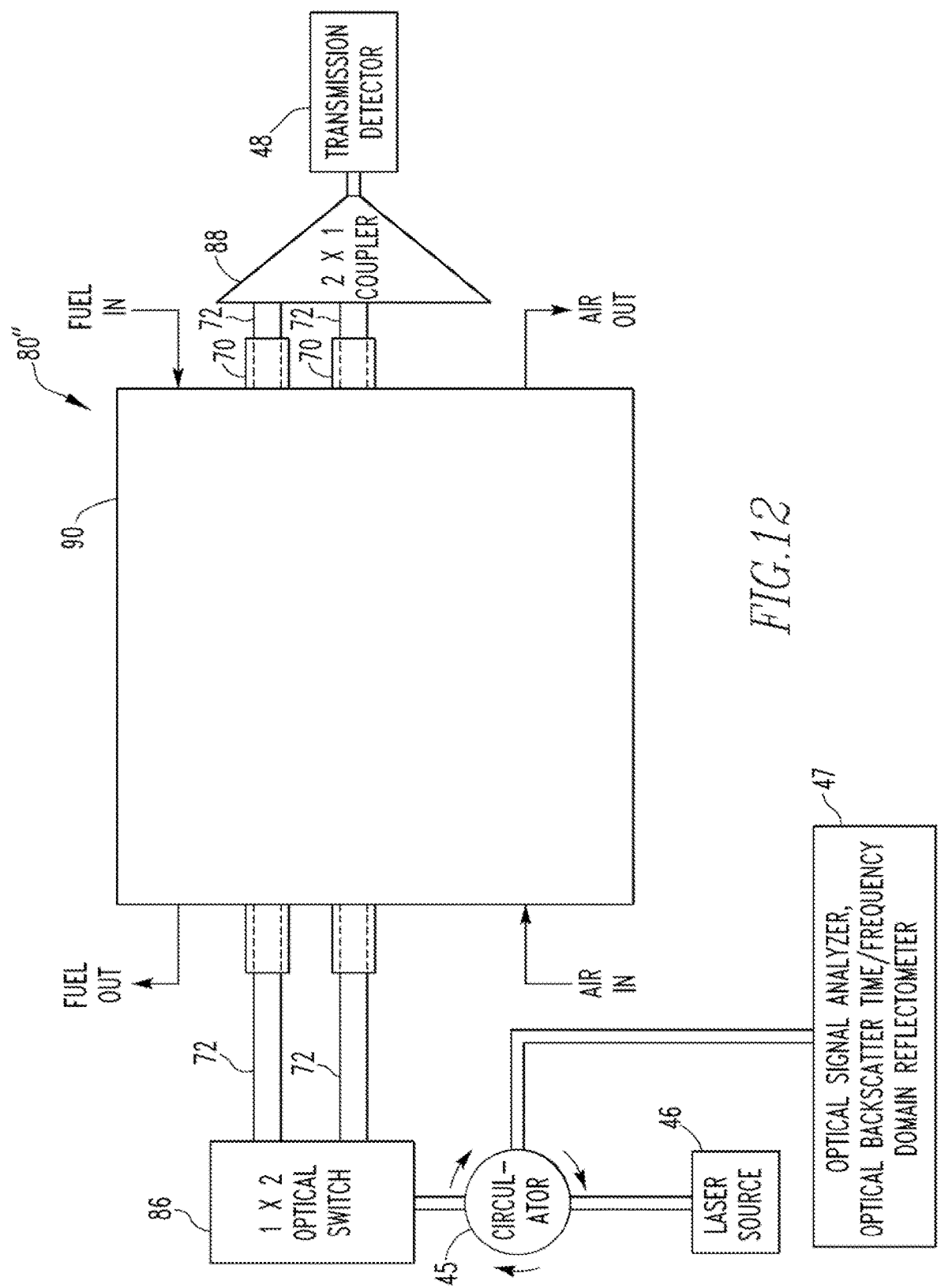

FIG. 10 is an example of such a system. In particular, FIG. 10 is a schematic diagram of an SOFC system 80 (showing a top plan view) according to still another exemplary embodiment of the disclosed concept. As seen in FIG. 10, SOFC system 80 includes SOFC stack 82 and three optical fiber sensing members 70 provided in the cathode stream that are selectively coupled to the transmission detector 48 (which is optional as described elsewhere herein) and circulator 45 of the interrogation system via an optical switch 82 and an optical coupler 84. FIG. 11 is a further alternative SOFC system 80' wherein an optical fiber sensing member 70 is provided in the cathode stream and another optical fiber sensing member 70 is provided in the anode stream. The two optical fiber sensing members 70 are selectively coupled to the transmission detector 48 and circulator 45 of the interrogation system via an optical switch 86 and an optical coupler 88. FIG. 12 is another alternative SOFC system 80" that is similar to SOFC system 80' (it has an optical fiber sensing member 70 in the cathode stream in another optical fiber sensing member 70 in the anode stream), except that it employs an SOFC 90 that is of the "co-flow" type employing a plurality of solid oxide fuel cells 4' as shown in FIG. 3.

Furthermore, while the exemplary embodiment shown in FIGS. 10, 11 and 12 employ optical fiber sensing members 70, it will be understood that that is meant to be exemplary only, and that one or more of those components may be substituted with an optical fiber sensor member 30 or 50.

Silica based optical fibers are well known to be delicate and brittle after being exposed to high temperature treatments, which makes ruggedized and high temperature stable packaging important for the actual deployment of silica based fibers as embedded sensors in connection with the various embodiment of disclosed concept described herein. Sapphire sensors are more mechanically rugged but they suffer from the disadvantages of cost and a lack of commercially available claddings, which makes the transmission signal sensitive to direct mechanical contact. There is also a need for approaches that allow for successful integration of optical fiber based sensors into an SOFC during operation. The disclosed concept provides several approaches, described below, for sensor fabrication, packaging, and integration to overcome these technical challenges.

As described elsewhere herein, typical SOFC assemblies consist of an anode, electrolyte, cathode, and interconnects as illustrated in FIGS. 1-3. According to an aspect of the disclosed concept, to ensure a gas-tight seal at the circumference of the cell, a glass-tape sealing process is employed using glass and glass-ceramic sealants, such as the products offered by Schott North America Inc. The glass tape sealing process requires a high temperature fabrication step (T=850° C. for example) that imposes significant mechanical stresses as the glass softens during the sealing process. To allow for insertion of optical fiber based sensors, such as optical fiber sensor members 30, 50 or 70, into a solid oxide fuel cell (e.g., solid oxide fuel cell 4 or 4) after the sealing process described above has completed, a mechanically robust and high temperature stable packaging assembly 34, 54, 74 is required. In one embodiment, shown in FIG. 13 as SOFC system 92 and shown in part in FIG. 14, such a packaging assembly 34, 54, 74 in the form of a tube member 94 is inserted into a solid oxide fuel cell 4 forming part of an SOFC stack 96 (similar to SOFC stack 22, 42, 62). In the illustrated embodiment, tube member 94 includes an alumina tubing member 98 within a nickel tubing member 100. Nickel tubing was selected as the tube material in the illustrated embodiment, however other high temperature stable metals and ceramics could also be selected. Tube member 94 as just described provides additional mechanical integrity for optical fiber member 32, 52, 72 and in some cases can also minimize any cross-sensitivity between the gas stream temperature and composition.

Figure 13:
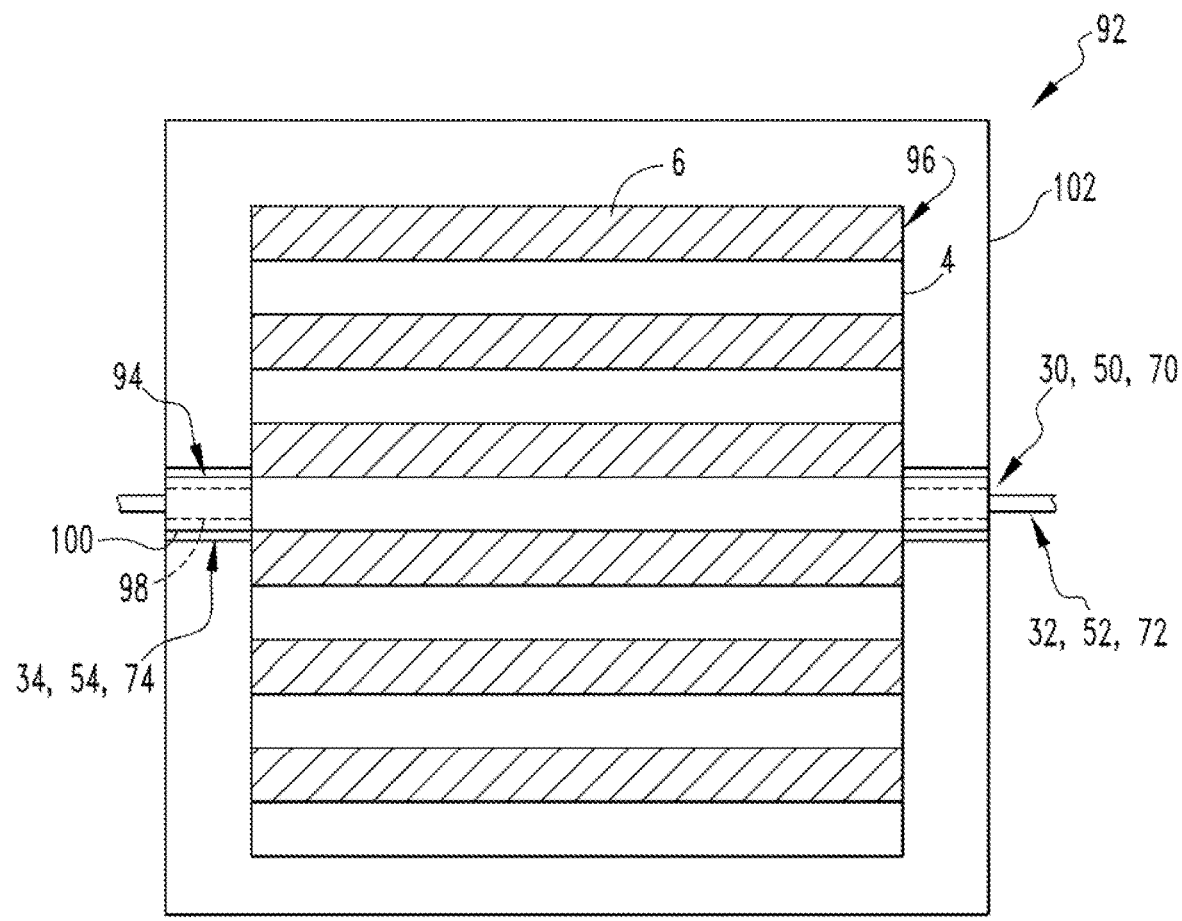
FIGS. 13-15 are schematic diagrams showing various packaging approaches that may be employed in connection with the disclosed concept.
Figure 14:
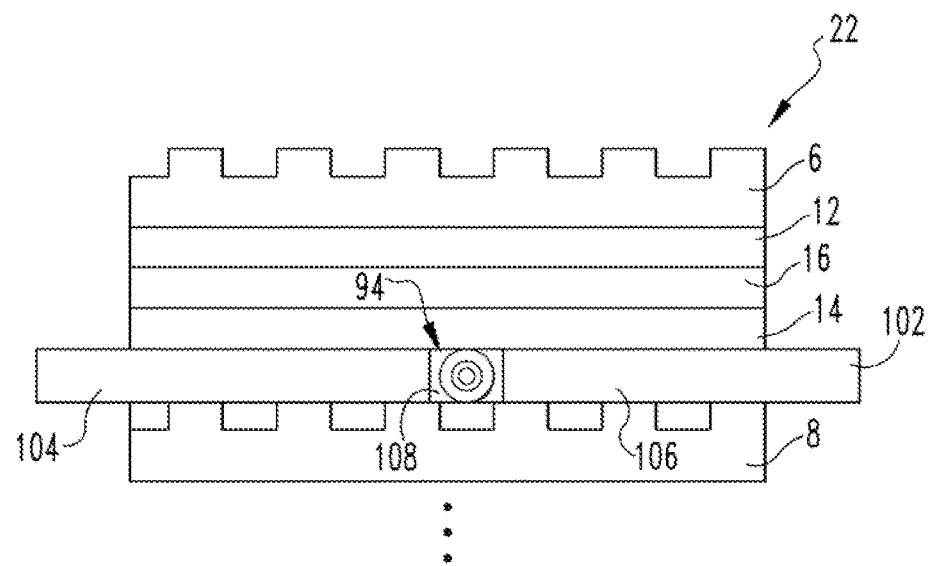
Figure 15:
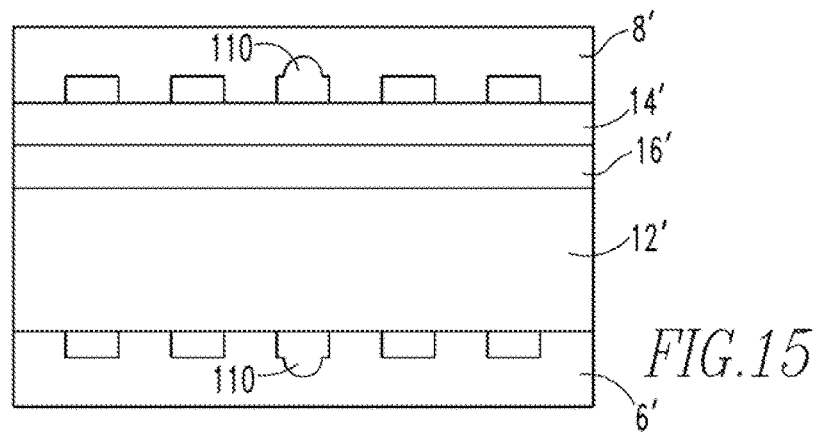

Furthermore, to accommodate the dimensions of the inserted tube member 94, a number of different approaches are provided according to the disclosed concept. FIGS. 13 and 14 illustrate one approach wherein a metallic spacer shim 102 having shim portions 104 and 106 and a recess portion 108 is provided between conductive interconnects 6 and 8 as shown. In an alternative approach, shown in FIG. 15, minor modifications are made to conductive interconnects 6 and 8 or 6' and 8' (shown) through machining symmetrical hemispherical grooves 110, which are structured to accommodate tube member 94. In still another approach, tube member 94 including the integrated sensor is embedded into the part (e.g., the conductive interconnects) through advanced manufacturing techniques such as additive manufacturing/3-d printing.

Figure 16:
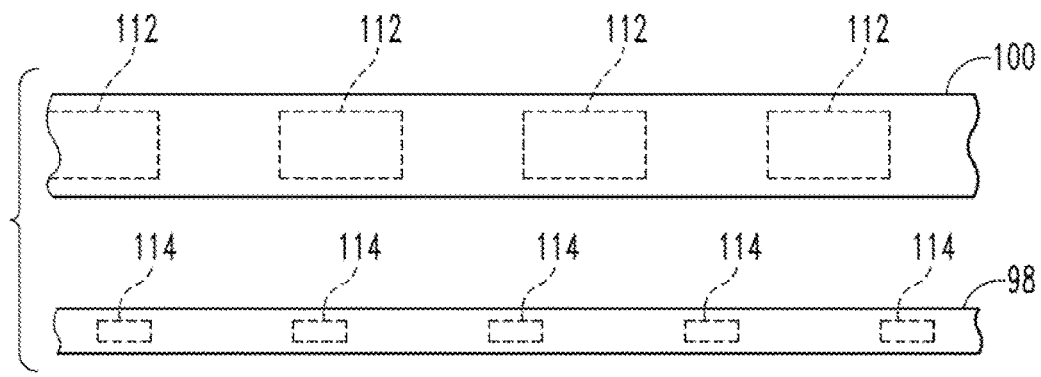
FIG. 16 shows to members that may form part of a packaging assembly according to an exemplary embodiment of the disclosed concept.

As discussed above, appropriate packaging of the optical fiber sensor can be required for silica based sensors to provide additional mechanical integrity. In the case where temperature is the primary parameter to be monitored, such packaging can also be used to avoid direct contact of the sensor element with the gas stream of interest. However, in cases where gas stream composition is a parameter to be monitored, the packaging must allow for access to the gas stream by the sensing element while still providing the level of mechanical integrity that is required for the application. The packaging must also allow for a gas-tight seal to be established at the entry points of the sensor into the SOFC. Two approaches that have been developed according to the disclosed concept for packaging include (i) providing tubing member 98, 100 as a solid alumina tube and solid nickel tube for temperature probes, and (ii) providing tubing member 98, 100 as alumina and nickel tubes that have undergone laser machining to produce slots 112 and 114 as shown in FIG. 16 for gas stream access to the optical fiber sensor element in the case of probes intended to monitor chemical composition of the gas stream.

Furthermore, in the various embodiments described herein, it is important to provide an adequate gas-tight seal at the point where the optical fiber sensing members (e.g., optical fiber sensing members 30, 50, 70) are inserted into an SOFC stack (e.g., SOFC stack 22, 42, 62). According to a further aspect of the disclosed concept, in order to provide such an adequate gas-tight seal, a combination of approaches may be used. One example approach employs Swagelok Teflon ferrules and fittings, which provide the gas tight seal on the portion of the fiber which is outside of the "hot zone" of the SOFC stack. In an alternative approach, a standard polymeric epoxy is used to provide the seal at the same location. While the latter approach is simpler and cost-effective, it does not allow for ease of interchanging probes after the first sensor has been installed.

Figure 17:
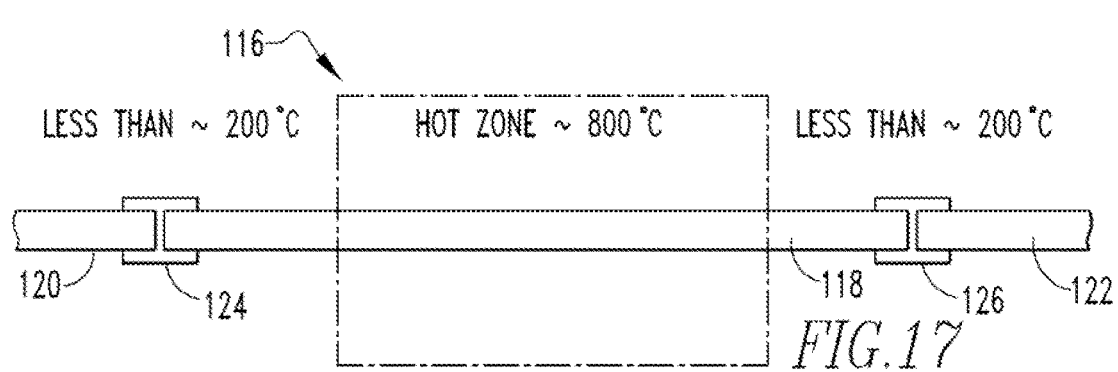
FIGS. 17 and 18 are schematic diagrams showing alternative optical fiber sensing members that may be employed in connection with an exemplary embodiment of the disclosed concept.
Figure 18:
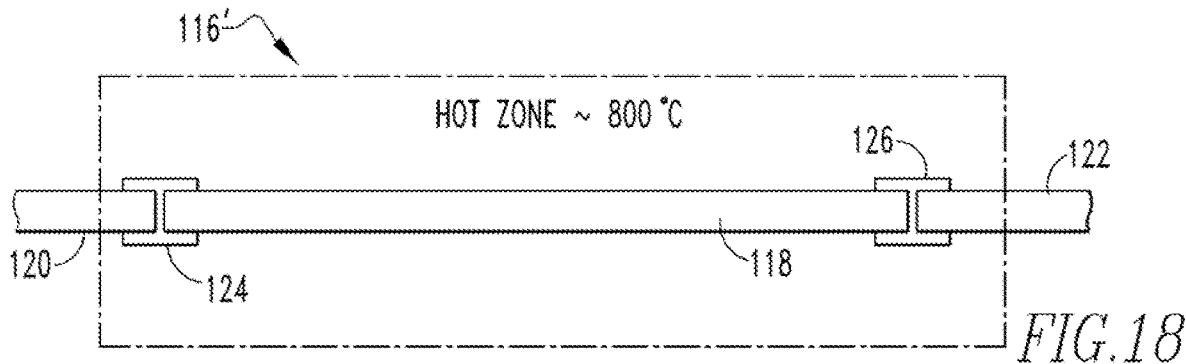

In some cases, sapphire fibers may be a preferred choice for embedded sensing applications due to the increased mechanical and chemical stability of such fibers in high temperature and harsh environment conditions as compared to silica based fibers. However, commercially available sapphire fibers do not have a cladding, making them highly sensitive to direct contact with particulates and contamination by volatile species. In addition, they are extremely expensive (at a cost of as much as $600/m), which makes it economically undesirable to use them as the launch and collection fibers for the exposed sensing element. One approach to overcome these challenges consists of the use of standard silica based fibers for the launch and collection fibers in combination with sapphire fibers to form an optical fiber sensing member that may be used in place of optical fiber sensing members 30, 50, and 70 in the various embodiments described herein. Several approaches for optically joining silica and sapphire based fibers within the scope of the disclosed concept are contemplated. FIG. 17 shows an optical fiber sensing member 116 wherein silica and sapphire based fibers are optically joined. In particular, optical fiber sensing member 116 includes a sapphire fiber member 118 (e.g., an Au/TiO$_2$ coated sapphire fiber member) that is joined to silica fiber members 120 and 122 (the launch and collection fibers) using mechanical couplers 124 and 126 to provide for direct mechanical alignment of silica fiber members 120 and 122 and sapphire fiber 118. As illustrated in FIG. 17, a portion of sapphire fiber member 118 is positioned within the "hot zone" of the system, wherein temperatures may be as high as, for example and without limitation, 800° C. The mechanical couplers 124 and 26 and the silica fiber members 120 and 122 are positioned outside of the "hot zone." In this embodiment, mechanical couplers 124 and 126 are high temperature ferrules (e.g., ZrO$_2$ ferrules) used in conjunction with a low-temperature adhesive such as a low-temperature epoxy. FIG. 18 shows an optical fiber sensing member 116' that is similar to optical fiber sensing member 116, except that a high temperature ceramic epoxy is used in conjunction with mechanical couplers 124 and 126. As a result, as shown in FIG. 18, mechanical couplers 124 and 126 may be located within the "hot zone." In one particular embodiment of optical fiber sensing member 116', ZrO$_2$ ceramic ferrules may be used to join the silica and sapphire fiber members, with a silica-based high temperature epoxy being used at the silica/ZrO$_2$ joint and an alumina-based high temperature epoxy being used at the alumina/ZrO$_2$ joint to minimize stresses at each joint associated with thermal expansion. As a further alternative, physical fusing of silica and sapphire fibers using advanced fusion splicing techniques may be used to create a suitable optical fiber sensing member.

The mechanical couplers 124 and 126 can be made of a variety of ceramic materials having low thermal expansion coefficients at high temperatures such as, for example, Kientec Systems, Inc. Zirconia Ferrules or couplers having 126.0 (close tolerance), 126 and 127 micron diameter holes through the length of a quarter inch. These ferrules could also be laser machined to cut them in half longitudinally and then cemented with alumina-based high temperature epoxy at the different fiber junctions providing for a potentially better seal.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A solid oxide fuel cell system, comprising:
    a solid oxide fuel cell stack including a number of solid oxide fuel cells, wherein each of the solid oxide fuel cells is structured to operate at a high temperature ranging from 500° C. to 1000° C.; and
    a sensor system structured to measure at least one of (i) a chemical composition of one or more reactants in a gas stream flowing through the solid oxide fuel stack, or (ii) a temperature of the gas stream flowing through the solid oxide fuel stack, the sensor system including an optical fiber sensing member including a monolithic in-fiber sensing element positioned inside one or more of the solid oxide fuel cells, wherein the monolithic in-fiber sensing element is structured to exhibit a change in one or more optical properties in response to changes in at least one of (a) the chemical composition of the one or more reactants and (b) the temperature of the gas stream, and wherein the monolithic in-fiber sensing element is structured to provide stable sensing at high temperatures ranging from 500° C. to 1000° C.;
    wherein the sensor system is structured to implement distributed sensing along the gas stream at a plurality of sensing locations along the monolithic in-fiber sensing element using a scattering based interrogation approach and without employing a plurality of in-fiber optic components in a core of the optical fiber sensing member such that the sensor system is configured to measure at least one of (i) the chemical composition of the one or more reactants with spatial resolution at the plurality of sensing locations, and (ii) the temperature of the gas stream with spatial resolution at the plurality of sensing locations.

2. The solid oxide fuel cell system according to claim 1, wherein the sensor system is structured to measure the chemical composition of the one or more reactants in the gas stream.

3. The solid oxide fuel according to claim 1, wherein the sensor system is structured to measure the temperature of the gas stream.

4. The solid oxide fuel cell system according to claim 1, wherein the sensor system is structured to measure the chemical composition of the one or more reactants in the gas stream and the temperature of the gas stream.

5. The solid oxide fuel cell system according to claim 1, wherein the scattering based interrogation approach is a back scattering based interrogation approach.

6. The solid oxide fuel cell system according to claim 1, wherein the gas stream is an anode stream within the solid oxide fuel cell stack or a cathode stream within the solid oxide fuel cell stack.

7. The solid oxide fuel cell system according to claim 1, wherein the optical fiber sensing member includes an optical fiber member provided within a packaging assembly.

8. The solid oxide fuel cell system according to claim 7, wherein the packaging assembly comprises a tubing member.

9. The solid oxide fuel cell system according to claim 8, wherein the tubing member comprises a first tubing member provided within a second tubing member.

10. The solid oxide fuel cell system according to claim 9, wherein the first tubing member is an alumina tubing member and the second tubing member is a nickel tubing member.

11. The solid oxide fuel cell system according to claim 8, wherein the tubing member includes a plurality of openings along a length thereof to enable gas to pass through the tubing member.

12. The solid oxide fuel cell system according to claim 7, wherein one of the solid oxide fuel cells includes an electrically conductive interconnect member having a plurality of passageways for permitting gas flow, wherein one of the passageways includes a groove provided in a surface of the conductive interconnect member, wherein a portion of the packaging assembly is received within the groove.

13. The solid oxide fuel cell system according to claim 7, wherein one of the solid oxide fuel cells includes an electrically conductive interconnect member, wherein at least a portion of the packaging assembly is embedded within the electrically conductive interconnect member.

14. The solid oxide fuel cell system according to claim 1, further comprising one or more shim plates provided between a first conductive interconnect and a ceramic member of one of the solid oxide fuel cells, and wherein the optical fiber sensing member is provided between the first conductive interconnect and the ceramic member.

15. A method of monitoring operation of a solid oxide fuel cell system comprising:
    providing a gas stream to a solid oxide fuel cell stack of the solid oxide fuel system, the solid oxide fuel cell stack including a number of solid oxide fuel cells, wherein each of the solid oxide fuel cells is structured to operate at a high temperature ranging from 500° C. to 1000° C., the solid oxide fuel stack having an optical fiber sensing member at least partially provided therein, wherein optical fiber sensing member includes a monolithic in-fiber sensing element positioned inside one or more of the solid oxide fuel cells, wherein the monolithic in-fiber sensing element is structured to provide stable sensing at high temperatures ranging from 500° C. to 1000° C.; and
    measuring at high temperatures ranging from 500° C. to 1000° C. and at a plurality of sensing locations along the monolithic in-fiber sensing element using a scattering based interrogation approach and without employing a plurality of in-fiber optic components in a core of the optical fiber sensing member at least one of: (i) a chemical composition of one or more reactants in the gas stream with spatial resolution at the plurality of sensing locations, and (ii) a temperature of the gas stream or a solid oxide fuel cell of the solid oxide fuel cell system with spatial resolution at the plurality of sensing locations, wherein the monolithic in-fiber sensing element is structured to exhibit a change in one or more optical properties in response to changes in at least one of (a) the chemical composition of the one or more reactants, and (b) the temperature of the gas stream.

16. The method according to claim 15, wherein the sensor system is structured to measure the chemical composition of the one or more reactants in the gas stream.

17. The method according to claim 15, wherein the sensor system is structured to measure the temperature of the gas stream.

18. The method according to claim 15, wherein the sensor system is structured to measure the chemical composition of the one or more reactants in the gas stream and the temperature of the gas stream.

* * * * *